March 30, 1954  H. H. WHEELER  2,673,448
HYDRAULIC VARIABLE SPEED DRIVE
Filed Oct. 6, 1949  6 Sheets-Sheet 1
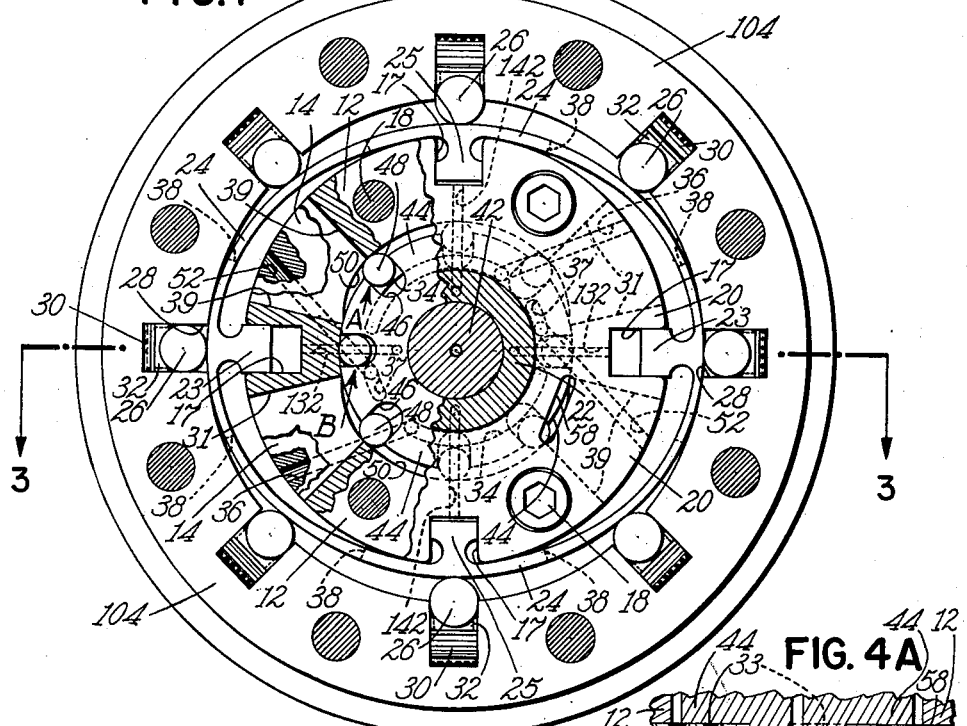
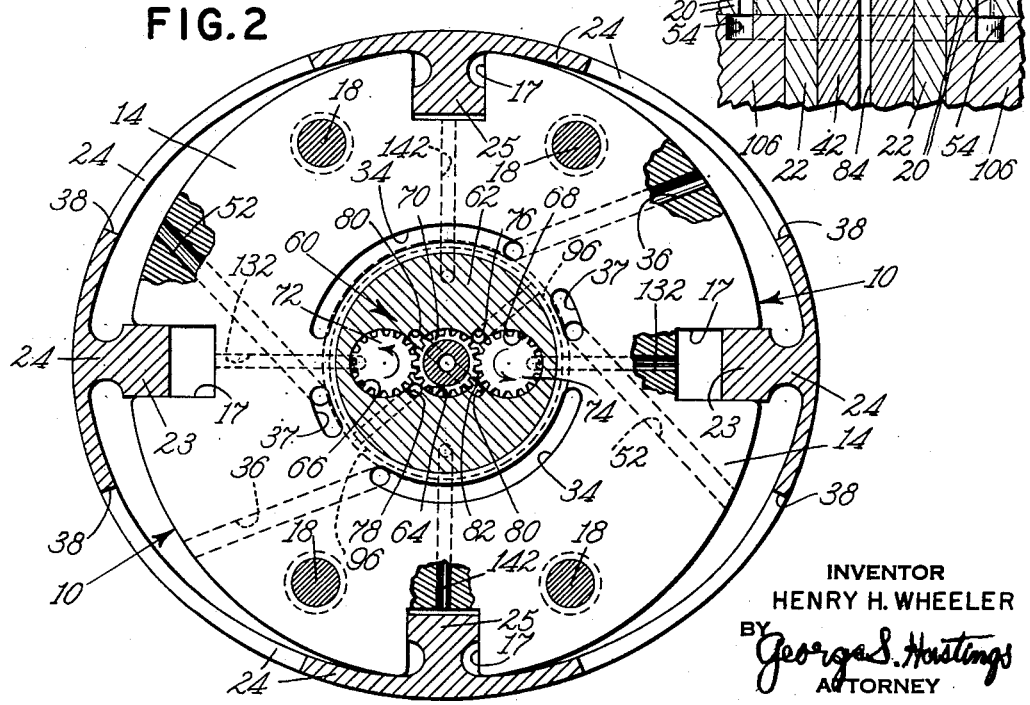
INVENTOR
HENRY H. WHEELER
BY George S. Hastings
ATTORNEY March 30, 1954
H. H. WHEELER
2,673,448
HYDRAULIC VARIABLE SPEED DRIVE
Filed Oct. 6, 1949
6 Sheets-Sheet 2
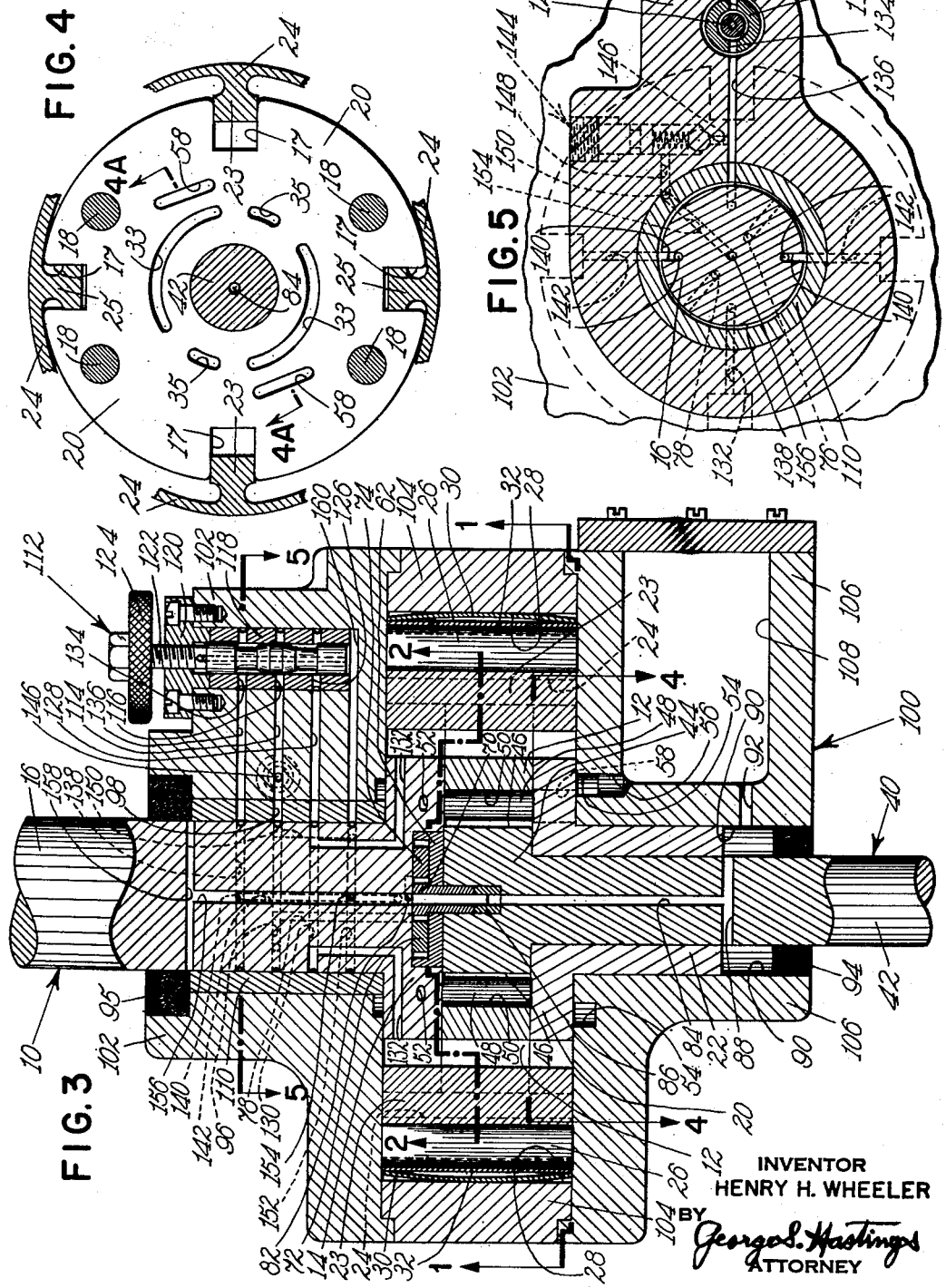
INVENTOR
HENRY H. WHEELER
BY
George S. Hastings
ATTORNEY March 30, 1954  H. H. WHEELER  2,673,448
HYDRAULIC VARIABLE SPEED DRIVE
Filed Oct. 6, 1949  6 Sheets-Sheet 3

INVENTOR
HENRY H. WHEELER
BY
George S. Hastings
ATTORNEY

March 30, 1954

H. H. WHEELER 2,673,448

HYDRAULIC VARIABLE SPEED DRIVE

Filed Oct. 6, 1949

INVENTOR
HENRY H. WHEELER
BY
George S. Hastings
ATTORNEY

March 30, 1954     H. H. WHEELER     2,673,448
HYDRAULIC VARIABLE SPEED DRIVE
Filed Oct. 6, 1949     6 Sheets—Sheet 5
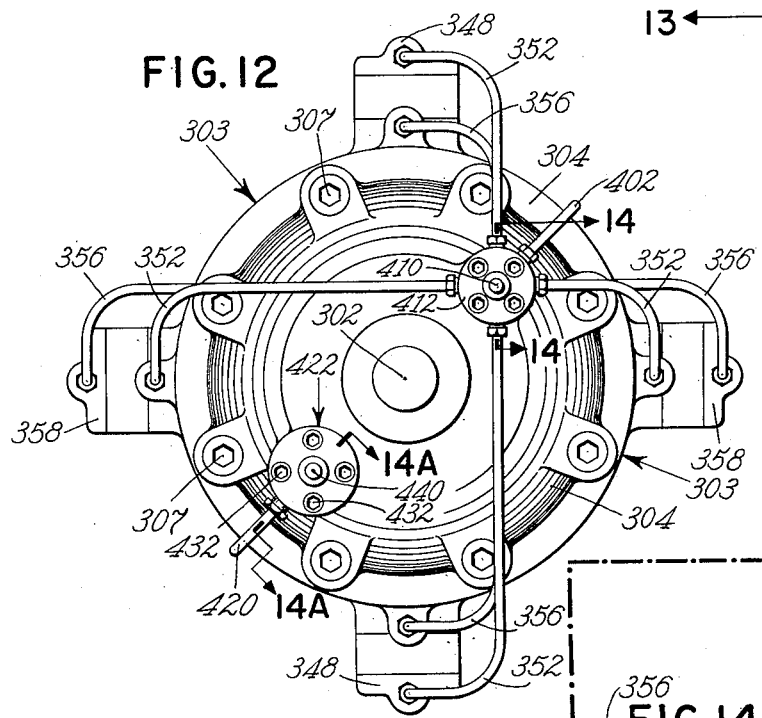
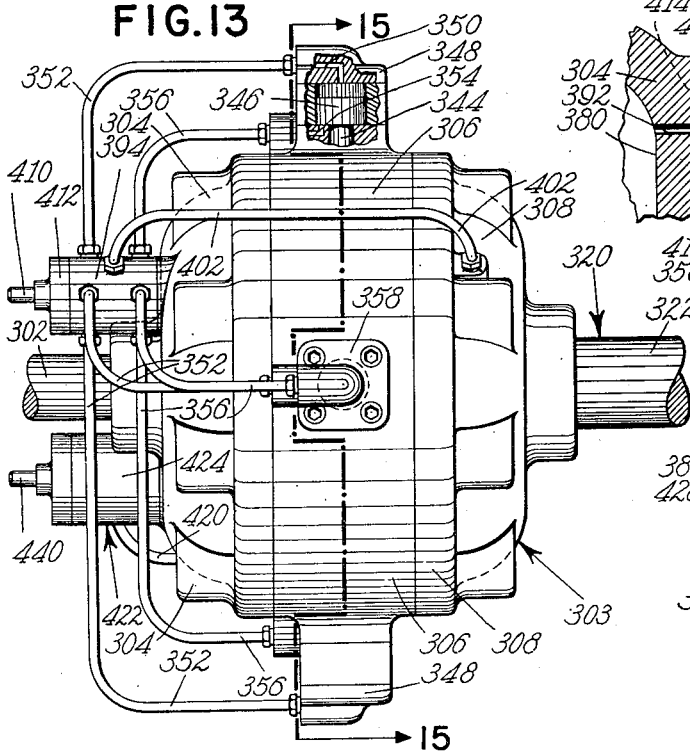
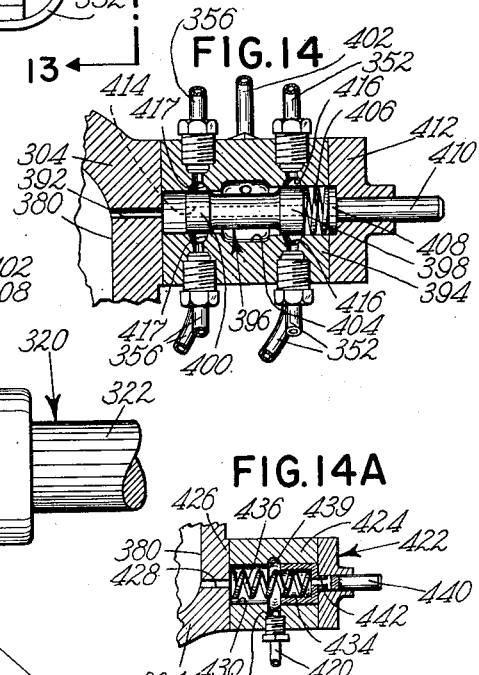
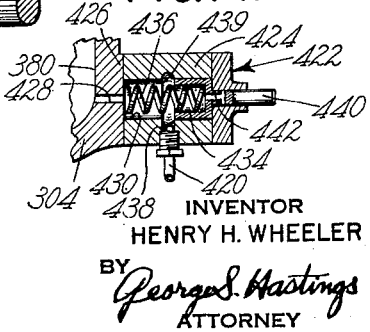
INVENTOR
HENRY H. WHEELER
BY George S. Hastings
ATTORNEY March 30, 1954  H. H. WHEELER  2,673,448
HYDRAULIC VARIABLE SPEED DRIVE
Filed Oct. 6, 1949  6 Sheets-Sheet 6
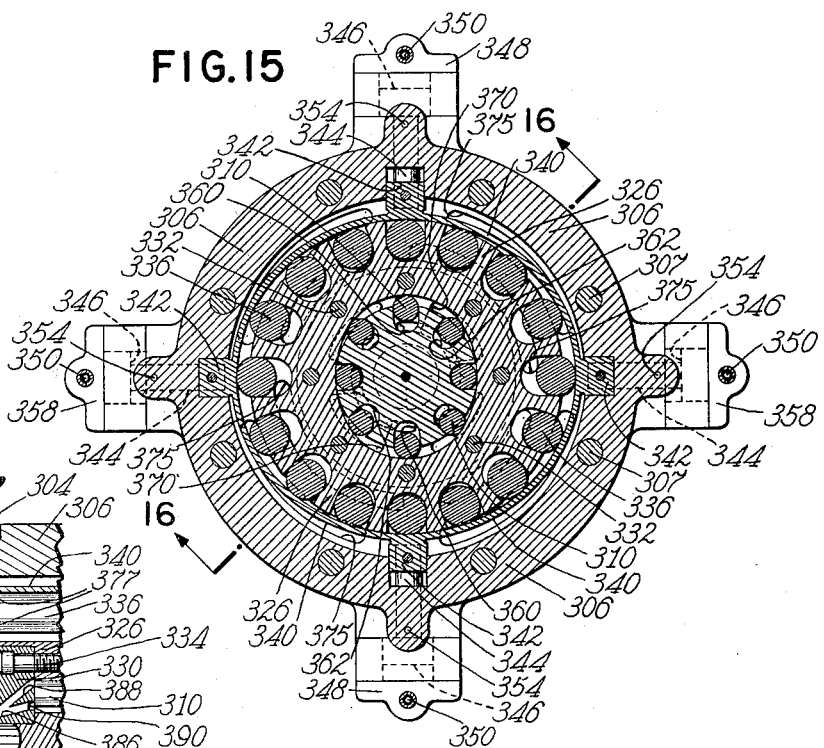
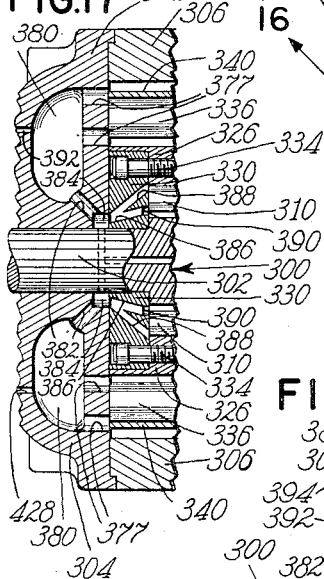
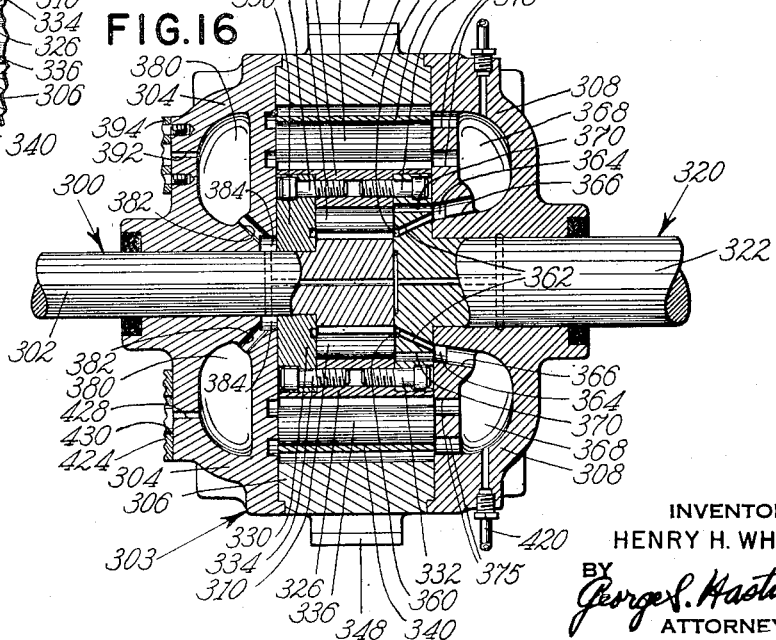
INVENTOR
HENRY H. WHEELER
BY George S. Hastings
ATTORNEY Patented Mar. 30, 1954

2,673,448

UNITED STATES PATENT OFFICE 2,673,448

HYDRAULIC VARIABLE SPEED DRIVE

Henry H. Wheeler, Bellerose, N. Y., assignor to International Cigar Machinery Co., a corporation of New Jersey Application October 6, 1949, Serial No. 119,801

24 Claims. (Cl. 60—53)

This invention relates to variable speed transmissions, more particularly to hydraulically operated transmissions of the constant horsepower type.

Most commercial variable speed transmissions are of the constant torque type. With the constant torque type of variable speed transmission, the output shaft can deliver maximum horsepower only at the highest speed of the output shaft, the horsepower decreasing with a decrease in output shaft speed.

One of the main objects of my invention is to increase the torque on the output shaft whenever its speed is decreased and thereby keep the horsepower supplied by the output shaft constant.

Another object of my invention is to provide variable speed transmissions wherein the pump and motor constitute a single unit having a common housing. Thus the output shaft or rotor may be the housing of the input pump shaft or rotor, whereby all friction between these two members will be converted into output torque. Therefore, there will be no friction loss in the pump.

One source of loss of efficiency in variable speed transmissions embodying my invention is the friction between the output rotor and the housing enclosing the same which is proportional to the speed. Another source of loss of efficiency is the slippage or leakage of the oil, or other liquid used, between the rotor and the rollers, or other equivalent members on the housing enclosing the output rotor.

As the loss of efficiency due to the oil flow decreases with an increase in the speed of the output rotor, and the friction increases as the speed of the output rotor increases, these two factors would tend to maintain the same efficiency at all speeds of the output shaft. It is believed that an overall efficiency of 85% or more may be obtained.

Another object of the invention is to minimize the loss of efficiency due to turbulent flow of the liquid by providing short straight ducts to and from the pump and motor.

Still another object of the invention is to vary the displacement of the motor and thereby obtain various ratios of the speed of the input and output shaft.

These and other not specifically mentioned objects may be obtained by the various embodiments of my invention hereinafter described and claimed.

In the accompanying drawings which form a part of this specification:

Fig. 1 is a cross-section taken on line 1—1 of Fig. 3 of a variable speed drive embodying my invention illustrating the construction of the rotors constituting the pump and hydraulic motor respectively;

Fig. 2 is a cross-section on a considerably enlarged scale of the variable speed drive taken on the line 2—2 of Fig. 3 and illustrating the gear pump and other parts of the mechanism for supporting and expanding the flexible ring of the hydraulic pump;

Fig. 3 is a longitudinal sectional view of the variable speed drive taken on the line 3—3 of Fig. 1;

Fig. 4 is a detail sectional view of the same taken on the line 4—4 of Fig. 3 and illustrating the construction of the rotors of the pump and hydraulic motor;

Fig. 4a is a sectional view of the same taken on line 4a—4a of Fig. 4;

Fig. 5 is a detail sectional view taken on the line 5—5 of Fig. 3 illustrating the construction of the spool valve;

Figure 6:
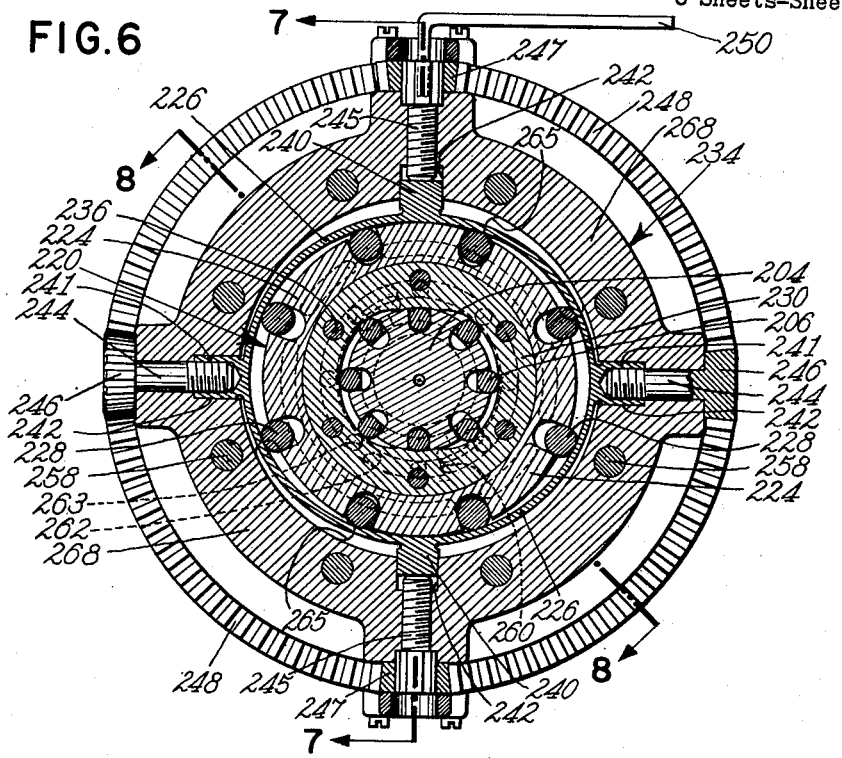
Fig. 6 is a cross-section taken on the line 6—6 of Fig. 7 illustrating the construction of the pump and hydraulic motor of a modified form of my invention.
Figure 7:
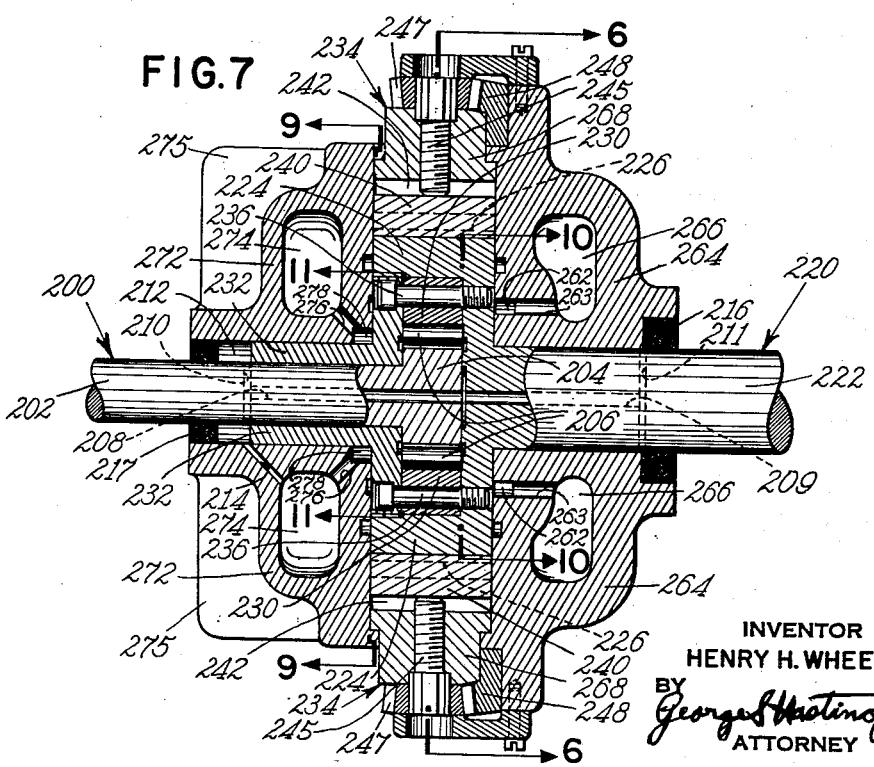
Fig. 7 is a longitudinal sectional view of the same taken on the line 7—7 of Fig. 6.
Figure 11:
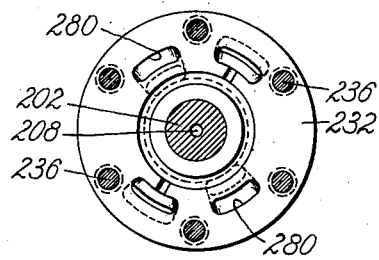
Figure 10:
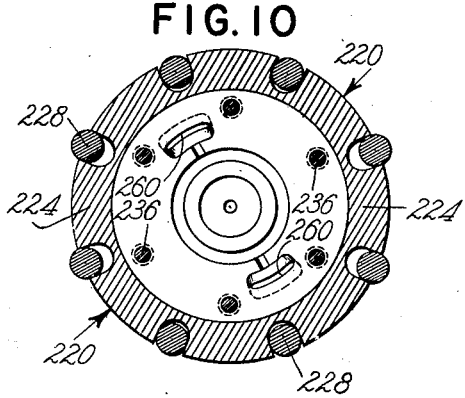
Figure 9:
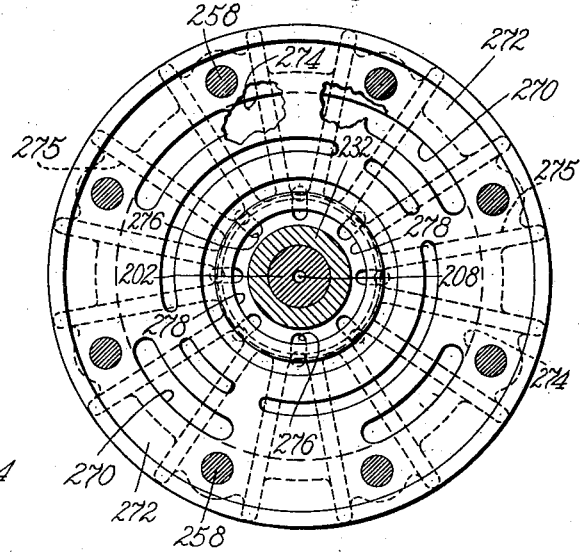

Figs. 9-11 inclusive are cross-sections of the same taken on the lines 9—9, 10—10 and 11—11 respectively of Fig. 7;

Fig. 12 is an end elevation of still another modified form of my invention which is suitable for use as an automobile transmission;

Fig. 13 is a side elevation of the same as viewed from the line 13—13 in Fig. 12;

Fig. 14 is a detail sectional view of the torque demand control valve thereof taken on the line 14—14 of Fig. 12;

Fig. 14a is a sectional view of the by-pass control valve thereof taken on line 14a—14a of Fig. 12;

Fig. 15 is a cross-section of the modified form suitable for use in an automobile taken on the line 15—15 of Fig. 13;

Fig. 16 is a longitudinal sectional view of the same taken on the line 16—16 of Fig. 15; and Fig. 17 is a sectional view of a 90° rotation of a portion of the pump rotor shown in Fig. 16.

Referring to Figs. 1-5 inclusive of the drawings, it will be observed that the embodiment of the invention illustrated therein is provided with an output rotor 10 and an input rotor 40. The input rotor 40 together with various coacting parts hereinafter described constitute an hydraulic pump which drives an hydraulic motor comprising the output rotor 10 and various coacting parts hereinafter described.

The output rotor 10 consists of an annular section 12 secured by bolts 18 between the integral flange 14 of the output shaft 16 and flange 20 of a flanged member 22 which are mounted in a stationary housing 100 consisting of heads 102 and 106 and ring 104 (as shown in Figs. 1 and 3). Rotor 10 carries a flexible ring 24 formed of suitable material such as steel, and provided with four equally spaced internal lugs 23 and 25. These lugs are slidably mounted in four slots 17 formed in the periphery of rotor 10 in the parts thereof consisting of integral flange 14, annular section 12 and flange 20. A number of rollers 26 are located in internal radial slots 28 formed in the annular section 104 of a stationary housing 100 wherein rotor 10 is revolubly mounted. The rollers 26 are each maintained in contact with ring 24 by a shoe 32 slidably mounted in each of the slots 28 and having an arcuate inner face fitting the diameter of the adjoining roller. Bowed leaf springs 30 are seated against the base of each slot 28, and their ends engage the flat outer face of the shoes 32 to maintain rollers 26 in yielding engagement with the periphery of ring 24 in the various flexed and unflexed positions thereof. If desired, yieldable hydraulic vanes of known type may be used instead of rollers 26.

When the ring 24 is in an unflexed position it is concentric with output rotor 10, and the latter runs at the same speed as the input rotor 40 and delivers its minimum torque as hereinafter explained. When this flexing ring is flexed to its maximum extent (as shown in Figs. 1, 2, 4 and 5) the output rotor runs at its lowest speed and delivers its greatest torque, the added torque resulting from the reaction hereinafter described of the liquid between the ring 24 and the annular section 104 of housing 100.

The input or pump rotor 40 (as shown in Figs. 1, 3 and 4) consists of a shaft 42 having an enlarged end 44 provided with an even number of axial slots 46 (Fig. 1). In each slot is slidably mounted a roller 48 coacting with a bore 50 formed in the annular section 12 of the output rotor 10. The bore 50 may have the shape shown in Fig. 1 wherein the diametrically opposite sectors thereof, which are intersected by the line 3—3, are concentric with rotor 40. If desired, the bore 50 may have a wholly elliptical shape. The annular section 12 is secured between the flange 14 on the inner end of shaft 55, which constitutes the output shaft, and the flange 20 integral with flanged member 22 by bolts 18. These parts constitute a housing for the input or pump rotor. Flanged member 22 supports the pump shaft 42 and is journaled in the section 106 of housing 100 which is provided with a sump 108. It is desirable that the output shaft 16 have a larger diameter than the input shaft 42, in order to withstand the greater torque imposed thereon. With this construction the axial thrust on the pump housing is balanced hydraulically. In order to maintain rollers 48 in tight contact with bore 50 at, for example, position A Fig. 1, there is provided on the inner face of flange 14 semiannular grooves 34 which communicate with ducts 36 communicating with the pressure chamber of the output motor. Correspondingly, in order to permit rollers 48 to retreat into slots 46 as shown in position B Fig. 1, there is provided circumferential grooves 37 on the inner face of flange 14 communicating with ducts 52 which in turn communicate with the exhaust chamber of the output motor. To provide balanced axial thrust complementary grooves 33 and 35 as shown in Fig. 4 are provided on the inner face of flange 20.

To control the position of the ring 24, there is a small double acting gear pump 60 (as shown in Figs. 2 and 3). The gear pump 60 comprises a disk or housing 62 secured in a cylindrical recess in the inner end of shaft 16. A series of overlapping cylindrical recesses 64, 66 and 68 (Figs. 2 and 3) are formed in the inner face of a disk 62. In the central recess 64 is mounted pinion 70 which meshes with the gears 72 and 74 housed in the recesses 66 and 68 respectively. Pinion 70 has an integral hollow stem extending through a hole in disk 62 into the enlarged inner end of an axial bore 84 in pump shaft 42 (Fig. 3) to permit oil to flow from the bore 84 through the pinion 70, as will be hereinafter described.

The output of pump 60 is delivered to a pair of drilled passages 76 and 78 formed in shaft 16 and extending from opposite sides of the recess 64 in disk 62 to a circumferential groove 96 formed in shaft 16. On the lower end of the stem of pinion 70 is provided a diametral tongue (not shown) which engages a diametral slot (not shown) formed on a bushing 86 which is rigidly secured in bore 84. Thus the pinion 70 will be driven by shaft 42 in a clockwise direction, as viewed in Fig. 2. A pair of ports 80 are formed in diametrically opposite portions of the recess 64 and communicate with an elongated slot 82 formed in the adjoining face of shaft 16 and extending diametrically thereof. The lower end of bore 84 communicates through a transverse hole 88 formed in shaft 42 with an annular well 90 which is formed by head 106, shaft 42, the end of member 22 and packing 94 (Fig. 3). The annular well communicates through duct 92 with oil sump 108. Since the sump, the bore 84 and all other internal cavities are filled with oil, the meshing of pinion 70 with gears 72 and 77 will deliver oil through a pair of drilled passages 76 and 78 to an annular groove 96 formed on the periphery of shaft 16 and oil will be fed from the sump 108 and through the bore 84 and pinion 70 into the grooves 80 and 82.

The annular groove 96 communicates with a port 98 formed in a bushing 110 which is secured in the head 102 of housing 100 wherein shaft 16 is revolubly mounted. The port 98 communicates with a duct 114 leading to the inlet 116 of a spool type valve 112. The inlet 116 of this valve is formed in a sleeve 118 which is mounted in a bore in head 102 and retained therein by a gland 120 secured to the outer face of head 102. A spool-shaped valve member 122 has a threaded portion which is screwed into the gland 120 and has a knob 124 on its outer end. By turning the knob 124 the valve member 122 may be moved inwardly and outwardly within sleeve 118 to regulate the flow of oil through valve 112. When the valve member 122 is moved outwardly as shown in Fig. 3, the oil will flow through the sleeve 118 and the outlet 126 thereof into the duct 128 extending through the head 102 and bushing 110 and leading to an annular groove 130 formed in the periphery of shaft 16. Groove 130 communicates with a pair of drilled passages 132 which extend through shaft 16 and deliver the oil to the space behind the pair of lugs 23 of ring 24 in two of the peripheral recesses of rotor 10. In this manner the ring 24 may be expanded to cause it to assume the elongated or eccentric shape illustrated in Figs. 1, 2 and 4.

The outlet 134 formed in the outer end of sleeve 118 communicates with a duct 136 extending through the head 102 and bushing 110 and communicating with an annular groove 138 formed in the periphery of shaft 16 (Figs. 3 and 5). Radial holes 140 drilled in groove 138 communicate with diametrically opposite ducts 142 in shaft 16 which are similar to ducts 132, but communicate instead with the spaces behind the other two peripheral recesses 17 of rotor 10 wherein the other two lugs 25 of ring 24 are mounted. Thus, in this manner, by moving valve member 122 inwardly, the ring 24 may be unflexed or contracted to cause it to assume a shape concentric with rotor 10 for 1:1 ratio operation.

To prevent excess pressure build-up there is provided on duct 114 a relief valve 144 with an inlet duct 146 and an outlet duct 148. Duct 148 communicates with duct 150 in bushing 110 which runs downward to communicate with annular groove 152 on shaft 16. One or more transverse ducts 154 (Fig. 5 illustrates one) communicate with axial bore 156 of shaft 16. There is also provided transverse duct 158 in shaft 16 communicating with bore 156 from packing 95. There is further provided a duct 160 running from the bottom of spindle valve 112 through head section 102 and bushing 110 and communicating with annular groove 152. Bore 156 communicates with intake grooves 82 and ports 80 of gear pump 60. Thus liquid from leakage around spindle valve 112 and around shaft 16 at packing 95 and the surplus liquid from relief valve 114 will all be returned to the intake of gear pump 60 for recirculation.

The circumferential lugs of flexing ring 24 are machined to a close fit in the slots 17 thereby forming an effective mechanical piston and cylinder.

An annular groove 54 on the inner face of head section 106 communicates with sump 108 by means of port 56 and with the intake of the pump rotor 40 by means of slots 58 through flange 20. In this manner liquid is returned to the pump from sump 108 to replace that lost by leakage around the rotor and shafts.

In operation, the sump 108 and all internal cavities are filled with liquid. Upon clockwise rotation of the input rotor, its rollers or vanes (if desired) tend to force the liquid ahead of them through the slots 31 in the annular portion 12 of the output rotor 10 into the housing ring 104. If flexing ring 24 is concentric, the liquid cannot pass as the casing is full. It, therefore, acts as a key and the output rotor will run at the same speed as the input rotor.

If, however, flexing ring 24 is elliptical an hydraulic motor is formed. The resulting pressure co-acting against the housing ring 104, the rollers 26 thereof and the now elliptical ring 24 (and its lugs 23) forces the output rotor to rotate in the same direction as the input rotor but at a slower speed proportionate to the difference in displacement of the output motor and input pump. Simultaneously, the oil ahead of the extended ends of the flexed ring 24 will pass through passages 39 into the intake side (clockwise rotation) of the input rotor. The transfer of liquid is relatively small, hence decreasing energy losses due to internal friction. The speed ratio of the input rotor to the output rotor is inversely proportional to the displacement of the input rotor to the displacement of the output rotor. As the elongation of the elliptical ring is increased the output rotor will displace more liquid and its relative speed will be decreased.

As the difference in the rate of speed in the input and output rotor increases, the gear pump with its housing 62 attached to the output rotor and its central driving pinion 70 detachably attached to the input rotor, pumps more liquid into the slot behind lug 23, thereby increasing the elongation of the elliptical ring 24. The liquid in the slots behind lugs 25 will leak out faster than it is replaced. It can readily be seen that there is no fluid movement at a 1:1 ratio. Hence the theoretical efficiency at a 1:1 ratio will be 100%.

Ring 24 is pierced by slots 38 located between four circumferential lugs 23 and 25. This permits pressure of the liquid to be equalized on the internal and external aspects of the ring, permitting free passage of the ring during rotation.

Figures 6–10 inclusive illustrate another embodiment of the invention. Here pump rotor 200 consists of a shaft 202 having an enlarged head 204 provided with peripheral slots in which are mounted rollers 206 and is otherwise of the same construction as that heretofore described in rotor 40 of Fig. 4. If desired, vanes of known type for hydraulic pumps may be substituted for rollers 206. The output rotor 220 is of similar construction as rotor 10 of Fig. 3, except that output rotor 220 consists of a shaft 222 having an enlarged inner end on which is formed a circumferential flange 224. Instead of having four slots to support and carry flexing ring 226, flange 224 of the output rotor has an even number of peripheral slots in which rollers 228 are mounted, or, if desired, vanes may be employed. Annular housing 230 containing an elliptical bore encloses the rollers 206 and is secured between the inner end of flanged member 232 and the inner end of shaft 222 by screws 236 passing through housing 230 and threaded into the inner end of shaft 222. Thus the inner end of shaft 222, housing 230, and flanged member 232 constitute a housing for the input rotor and themselves rotate in stationary housing 234 composed of annular section 268 fastened by bolts 258 between left hand head section 272 and right hand head section 264. Cooling fins 275 may be placed on head sections 272 and 264 as desired.

In order to prevent pressure due to leakage of liquid from flowing out packings 216 and 217, there is provided in shafts 202 and 222 communicating axial bores 208 and 209 respectively. Transverse duct 211 in shaft 222 connects bore 209 with the interstice of shaft 222 and packing 216. Bore 208 communicates with annular well 212 formed between shaft 202, the outer end of flanged member 232, packing 217 and head section 272. Said well 212 communicates with the non-pressure annular chamber 274 by means of one or more ducts 214 in left head section 272. There is further provided a cylindrical recess 218 in the inner end of shaft 222 having a diameter equal to that of shaft 202. This equalizes the axial thrust on shaft 202.

The flexing ring 226 has two pair of external radial lugs 240 and 241 which slidably engage with four corresponding slots 242 in the annular section 268 of the stationary housing 234. Ring 226 is flexed by the push and pull action effected by screws 244 threaded into the lugs 241 and screws 245 threaded in annular section 268 of stationary housing 234 and bearing against the lugs 240. Each screw 244 is integral with a bevel gear 246 formed on its head; while each screw 245 slidably engages with a bevel gear 247 by means of a splined portion provided at the head end of said screw. The turning of bevel gear 247 rotating the screws 245 thus permits the screw to move either inwardly or outwardly. The bevel gears 246 and 247 mesh with and are actuated by a ring gear 248. In this manner, by manually turning handle 250 all four screws 244 and 245 are simultaneously actuated thereby expanding ring 226 to the desired eccentric shape as, e. g., shown in Fig. 6.

Figure 8:
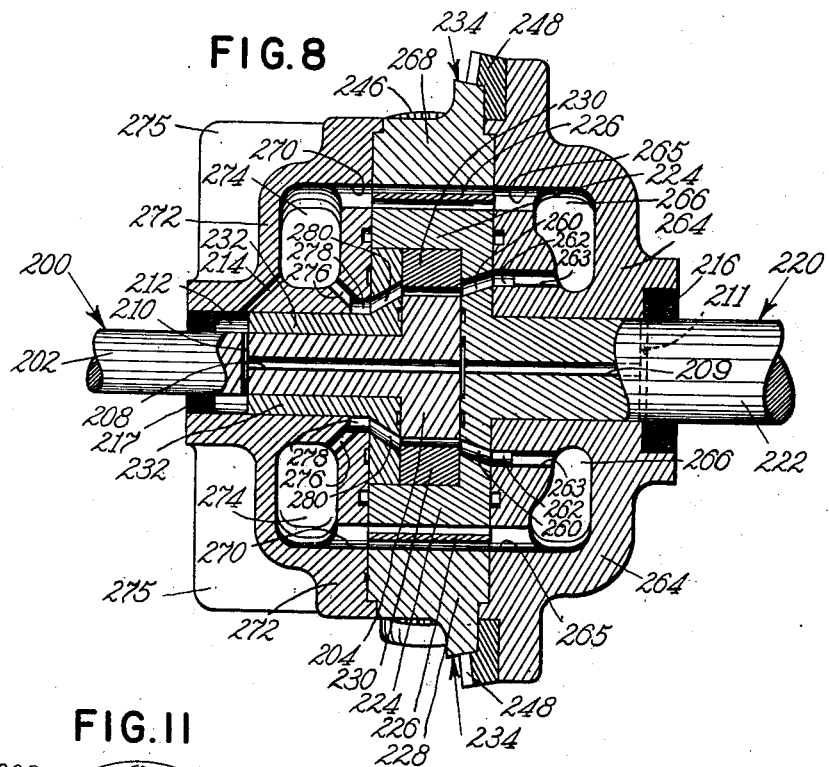
Fig. 8 is a longitudinal sectional view of the same taken on the line 8—8 of Fig. 6.

With this construction, liquid is forced from the input pump rotor by the engagement of rollers 206 with the elliptical bore of housing 230 into ports 260 (Figs. 8 and 9) extending through the inner end of shaft 220. Ports 260 communicate with a concentric groove 262 on the inner face of the right hand head section 264 of housing 234. Head section 264 is provided with ducts 263 leading from groove 262 to an annular chamber 266 (Figs. 7 and 8) formed in said head section 264. Pressure thus created forces liquid out of chamber 266 through ports 265 into the motor intake, that is, the space between the periphery of flange 224 and ring 226 in housing 234 (Fig. 8). This pressure, co-acting on the annular section 268 of the stationary housing 234, the ring 226, and the rollers 228, causes the output rotor to rotate to the discharge portion thereof. The liquid then passes through ports 270 formed in the left hand section 272 of housing 234 into the annular chamber 274 of head section 272 from which it is drawn to the pump inlet for re-circulation. Pump inlet comprises a duct 276 formed in head section 272 extending from chamber 274 to an annular groove 278 also formed in head section 272 communicating with ports 280 formed in the flange on the inner end of member 232. Ports 280 communicate with the inlet of the input rotor.

Fig. 8 illustrates the right hand section 264 ninety degrees out of its true position to left hand section 272 and flange member 232 in order to show the passages for the liquid from the pump through the right hand head to the motor through the left hand head and return to the pump.

In operation, the ratio of speed of the input shaft to the output shaft is controlled manually by handle 250. For the reasons heretofore described, when the ring 226 is concentric to the rotors a 1:1 ratio is obtained. As the eccentricity of the ring 226 is increased the relative speed of the output rotor will be decreased but its torque increased.

Figs. 12-17 illustrate another embodiment of my invention which constitutes a torque demand controlled transmission, suitable for automobiles. In this construction the ratio of output to input speed is controlled by the torque required to turn the wheels of the automobile in which this transmission is installed.

Referring to Figs. 15 and 16 it will be seen that the input rotor 300 comprises an input shaft 302 which will be driven from the engine of the automobile in which it is installed. Shaft 302 is revolubly mounted in the left hand head section 304 of a stationary housing 303 which also includes an annular section 306 arranged between and secured to head 304 and a right hand head section 308 of the housing by bolts 307. The enlarged inner end of shaft 302 is provided with a series of peripheral slots wherein are mounted the rollers 310, or vanes, if desired. The output rotor 320 includes an output shaft 322, which may be suitably connected to the differential driving the wheels of the automobile. Shaft 322 is revolubly mounted in head section 308 and has an enlarged head 324 on its inner end which abuts the inner end of shaft 302. An annular portion 326 is provided with an elliptical bore in which is located the enlarged inner end of shaft 302 with its rollers 310. Concentric flanges at either end of annular housing 326 are supported on the periphery of head 324 and the periphery of a disk 330 revolubly mounted on the portion of shaft 302 adjacent its enlarged inner end. Housing 326 may be secured to the head 324 and disk 330 by suitable means such as the screws 332 and 334. Housing 326 is provided with a series of slots in its periphery in which are slidably mounted the rollers 336, or, if desired, vanes may be substituted for the rollers 336. A ring 340 formed of metal or other suitable flexible material may be provided with four diametrically opposed lugs 342. Each of these lugs is slidably mounted in one of four diametrically opposite slots provided in the wall of the concentric bore provided in the housing section 306. Each of the lugs 342 is connected to the inner end of a piston rod 344 extending radially through housing section 306 and connected at its outer end to a piston 346 (Fig. 13) in one of a series of cylinders 348 and 358 provided on housing section 306. In one end of each cylinder 348 and 358 there is provided a port 350 communicating with one end of the bore wherein piston 346 is slidably mounted, and pipe 352 in the case of cylinders 348 and pipe 356 in the case of cylinders 358. In the other end of each cylinder 348 there is provided a similar port 354 communicating with the other end of the bore wherein piston 346 is slidably mounted. Port 354 also communicates with a pipe 356 in the case of cylinder 348 but with pipe 352 on the side cylinder 358. The operation of the pistons 346 for the purpose of expanding ring 340 from the concentric shape it normally has will be hereinafter described.

When the flexing ring 340 has a concentric shape the output rotor will be driven in a 1:1 ratio with the input rotor for reasons previously explained in connection with the description of the construction shown in Figs. 1-9 inclusive. The ring 340 will be automatically expanded to a more or less elliptical shape such as shown in Fig. 15 when the output rotor is driven at any one of various speeds within a predetermined range of speeds which corresponds to the speed required to deliver the torque necessary to turn the wheels of the automobile. Since all the cavities within the rotors and the stationary housing are filled with oil, the rollers 310 of the input or pump rotor will circulate the liquid in the following manner. The liquid will be delivered from the bore within rotor housing to annular groove 360 formed in the inner face of the head 324, and will flow through a series of diagonally extending ducts 362 also formed in head 324 and communicating with an annular groove 364 formed in the inner face of the head section 308 and communicating through a series of ducts 366 also formed in head 308 with an annular chamber 368 likewise formed in head 308. If desired, there may also be provided in the head 324 a suitable number of concentric ports 370 communicating with the bore in rotor housing 306 and the annular groove 364 in the head section 308.

The pressure so created in annular chamber 368 by the delivery of liquid thereto causes a flow of liquid through the concentric ports 375 into the intake of the motor, that is the space between the annular housing 306 and the rotor housing 326. The coaction of the rollers 336 with flexing ring 340 causes the rotor housing 326 to rotate 90° to the discharge ports 377. The liquid then flows through ports 377 into an annular chamber 380 formed in head section 304. The suction of the input or pump rotor will then draw the liquid from chamber 380 through ducts 382 into an annular groove 384 formed in the inner face of head 304. Groove 384 communicates with a series of diverging ducts 386 and 388 (Fig. 17) formed in disk 330, the ducts 386 communicating with a concentric groove 390 formed in the inner face of disk 330, whereby the liquid will be delivered to the bore inside rotor housing 326 to again be re-circulated by the coaction therewith of the rollers 318 on the pump rotor. It may be noted that the ducts 386 and 388, the ports 377 and grooves 390 are not visible in Fig. 16 because they are spaced 90° from the section line 16—16 in Fig. 15. Fig. 17 represents a 90° rotation of Fig. 16.

Fig. 14 includes a cylinder 394 having a bore communicating with duct 392. In this bore is slidably mounted a four-way spool type valve 396 having a head 398 at the right side of this view of greater diameter than the head 400 at the left side thereof. A pipe or conduit 402 from the annular chamber 368 on the output or pressure side of my transmission is connected to a chamber 404 located between the two heads of spool valve 396, and forming a portion of the bore in cylinder 394. The remainder of this bore closely fits the head portions 398 and 400 of the valve. A spring 406 seated against the head 398 of the valve coacts with a head 408 formed on a plunger 410 slidably mounted in the cover plate 412 of the valve housing or cylinder 394. Four pairs of pipes 352 and 356, which are connected to the cylinders 348 and 358 in the manner previously described, communicate with two internal annular grooves 416 and 417 formed in the portion of the valve housing opposite to each of the valve heads. Each pair of these pipes is connected to opposite ends of a cylinder 348 having a piston 346 whose piston rod 344 is connected to the flexing ring 340 (Fig. 15). Figs. 12 and 13 show the pipes 352, 356 are so connected to the cylinders 348 that when the pistons in the top and bottom cylinders push in, those at the sides pull out and vice versa. Duct 392 communicates with chamber 380 on the non-pressure or intake side of my transmission. An axial bore 414 through spindle 396 prevents pressure accumulating on the spring side of head 398.

In operation, as the input or pump rotor starts to turn, pressure is created in the chamber 368 due to resistance of the wheels of the automobile. This pressure will be delivered through pipe 402 to chamber 404 and thereby force spool valve 396 (Fig. 14) to the right due to the difference in the diameters of the spool heads. The spring 406 seated against the head 398 resists this pressure until full engine torque is developed, whereupon the spool head 398 will have moved enough to the right to allow liquid to flow from annular chamber 404 through pipes 352 to the outer ends of the top and bottom cylinders 348 and through the pipes 356 to the inner ends of the left and right cylinders 358. This causes flexing ring 340 to be extended from the concentric position it normally occupies to the more or less elliptical shape shown in Fig. 15 and thereby produce the maximum torque on the output rotor. As the car starts to accelerate this pressure will drop, causing spring 406 (Fig. 14) to force spool to the left and gradually bringing flexing ring 340 back to the concentric position at which the ratio of the speeds of the input and output rotors will be nearly 1 to 1. When plunger 410 is manually pressed inwardly to force the spool valve 396 to the left, the operation of cylinders 348 is reversed and the output rotor will be reversed to back the car.

This valve 396 also operates to provide a braking effect to the automobile, particularly on a downhill grade. The inertia of the automobile drives the output motor rotor causing it to operate as a pump. This pump action produces pressure in non-pressure chamber 380, thus driving the input rotor. Pressure chamber 368 for like reasons becomes a non-pressure chamber. The flow of liquid in the valve is reversed in the following manner: Liquid under pressure passes from chamber 380 through duct 392 into the left side end of the bore of cylinder 394 and thence through axial bore 414 of the spool valve 396. The external pressures on the spool thus create an axial thrust to the left by virtue of the difference in the diameters of the spool heads. Spring 406 is thereby permitted to expand to slide the spool valve fully to the left. The flow of said liquid under pressure then continues from bore 414 by annular groove 416 through pipes 352 so that the annular member 340 is flexed to its greatest extent, whereby the output rotor is at its fullest capacity and the transmission is in "low gear."

An automobile equipped with this novel transmission is automatcially "braked," both on the downhill grade and in stop and go maneuvers, such as commonly encountered in slow moving traffic and in parking. Indeed, since the transmission is in its "lowest gear" the automobile would have to be driven or accelerated by the operator on downhill grades, a feature greatly desired for the safe operation of motor vehicles.

In order to provide a neutral or idling position for my transmission there is provided a by-pass pipe 420 from the annular pressure chamber 368 to a spring actuated valve 422 (Figs. 12, 13 and 14a) which comprises a casing 424 suitably secured by bolts 432 to a boss 426 on head 304. A duct 428 in head 304 communicates with annular chamber 380 and the bore 430 of casing 424 in which is valve piston 434. This piston is moved to the right or open position by spring 436. A T-shaped duct 442 in piston 434 provides hydraulic balance along the axis of the piston 434. Liquid from the pressure side thus passes through by-pass pipe 420 through duct 438 and groove 439 in casing 424 into bore 430 through duct 428 to non-pressure chamber 380 preventing pressure from being generated. A rod 440 passing through the top of casing 424 may be manually pressed to close the valve 422. Any suitable locking device may be provided to hold said rod 440 in the closed position. It is apparent that when the valve is open the pressures in chamber 368 and 380 are equalized and the output rotor of the transmission will not be driven by the input rotor. Thus the transmission will be in neutral or idling position.

I wish it understood that various changes in form of, portions of, and minor details of construction may be resorted to within the scope of the appended claims. For example, it would be within the scope of this invention to place the flexible annular member on the input pump rotor and/or on the output motor rotor, also vanes may be substituted for any and all rollers on either the input or output rotors and various means may be employed for flexing the flexible ring that determines the capacity of the output motor. I do not wish to limit myself to the specific design and construction herein illustrated, except to the extent such limitations are imposed by the appended claims.

Having thus described my invention, what I claim is:

1. A variable speed variable torque hydraulic transmission comprising a single outer housing; a bore in said outer housing; an output motor rotor, mounted in said bore of said outer housing; an eccentric bore in said output motor rotor; an input pump rotor revolubly mounted in said eccentric bore; a flexible annular member positioned between said output motor rotor and the wall of said bore of said outer housing; equidistant radial lugs on the inner surface of said annular member mounted in corresponding radial slots of said output motor rotor thereby adjustably securing the annular member on the periphery of said output motor rotor; radially movable members coacting with the bore of said outer housing and said flexible annular member to form contracting and expanding chambers bounded by said outer housing, said annular member and said radially movable members; means for flexing said annular member to form said chambers into variable capacity hydraulic expanding and contracting chambers at said output motor rotor; radially movable members coacting with said input pump rotor and said eccentric bore in said output motor rotor to form contracting and expanding chambers bounded by said input pump rotor, said bore of said output motor rotor and said radially movable members; openings through said output motor rotor connecting the contracting chamber at said input pump rotor with the expanding chamber at said output motor rotor; and openings through said output motor rotor connecting said contracting chamber at said output motor rotor with said expanding chamber at the input pump rotor.

2. In a variable speed variable torque hydraulic transmission, an input pump rotor; an output motor rotor, said output motor rotor forming a housing for said input pump rotor; a plurality of equidistant radial slots on the periphery of said output motor rotor; a flexible annular member surrounding said output motor rotor; a plurality of inwardly projecting radial lugs on said annular member slidably inserted in said slots of the output motor rotor in a substantially piston-like manner; an auxiliary pump operatively mounted on said rotors so that said pump is driven as the relative speed of the output pump rotor and the output motor rotor varies; passages connecting the output of said auxiliary pump to the space behind two opposing radial lugs of said annular member to distort said annular member; a manually controlled valve interrupting said passages whereby the flow of liquid therein may be controlled; and a unitary housing enclosing said transmission whereby the same may be entirely filled with liquid.

3. In a variable speed variable torque hydraulic transmission, an input pump rotor; an output motor rotor; a plurality of equidistant radial slots on the periphery of said output motor rotor; a flexible annular member surrounding said output motor rotor; a plurality of inwardly projecting radial lugs on said annular member slidably inserted in said slots of the output motor rotor in a substantially piston-like manner; an auxiliary pump; passages from said pump to the space behind two opposing radial lugs of said annular member; a control valve interrupting said passages to control the flow of liquid in said passages; a relief valve located on the passage communicating said auxiliary pump to said control valve to prevent excess pressures in said passage; and a unitary housing enclosing said transmission whereby the same may be filled with liquid.

4. In a variable speed variable torque hydraulic transmission, an input pump rotor; an output motor rotor; a plurality of equidistant radial slots on the periphery of said output motor rotor; a flexible annular member surrounding said output motor rotor; a plurality of inwardly projecting radial lugs on said annular member slidably inserted in said slots of the output motor rotor in a substantially piston-like manner; an auxiliary pump operatively mounted on said rotors whereby said pump is driven as the relative speed of the output pump rotor and the output motor rotor varies; passages connecting the output of said auxiliary pump to the space behind two opposing radial lugs of said annular member whereby said annular member may be flexed; a manually controlled valve interrupting said passages to control the flow of liquid in said passages; and a housing enclosing said transmission whereby the same may be entirely filled with liquid.

5. In a variable speed variable torque hydraulic transmission, an input pump rotor; an output motor rotor; a plurality of equidistant radial slots on the periphery of said output motor rotor; a flexible annular member surrounding said output motor rotor; a plurality of inwardly projecting radial lugs on said annular member slidably inserted in said slots of the output motor rotor in a substantially piston-like manner; an auxiliary pump; passages connecting the output of said auxiliary pump to the space behind two opposing radial lugs of said annular member to flex said annular member; and means for controlling the flow of liquid in said passages to effect a desired flexure of said annular member.

6. In a variable speed variable torque hydraulic transmission, an input shaft; an input pump rotor; an output shaft; an output motor hydraulic rotor; a concentric bore in said output shaft wherein the input shaft is revolubly mounted; a symmetric elongated non-circular bore in said output motor hydraulic rotor wherein said input pump hydraulic rotor is revolubly mounted to form dual contracting and expanding chambers; a unitary housing enclosing said output shaft and said output motor hydraulic rotor to form contracting and expanding cavities therewith; short straight slots through said output motor hydraulic rotor communicating said elongated bore in said output motor hydraulic rotor with said expanding cavities between said output motor hydraulic rotor and said housing so that liquid may pass from the contracting chambers of said input pump hydraulic rotor to the expanding cavities of said output motor rotor; and other short straight slots through said output motor hydraulic rotor communicating said contracting cavities between said output motor hydraulic rotor and said housing with said elongated bore in said output motor hydraulic rotor so that liquid may pass from the contracting cavities of said output motor hydraulic rotor to the expanding chamber of said input pump hydraulic rotor.

7. In a variable speed variable torque hydraulic transmission, an input shaft; an input pump rotor; an output shaft; an output motor hydraulic rotor; said output shaft having a portion forming the bearing for said input shaft; a symmetrical non-circular bore in said output motor hydraulic rotor wherein said input pump hydraulic rotor is revolubly mounted to form contracting and expanding chambers; a unitary housing enclosing said output shaft and said output motor hydraulic rotor to form contracting and expanding chambers therewith; short straight slots through said output motor hydraulic rotor communicating said eccentric bore in said output motor hydraulic rotor with said cavity between said output motor hydraulic rotor and said housing so that liquid may pass from the contracting chamber of said input pump hydraulic rotor to the expanding chamber of said output motor rotor; short straight slots through said output motor hydraulic rotor communicating said cavity between said output motor hydraulic rotor and said housing with said bore in said output motor hydraulic rotor so that liquid may pass from the contracting chamber of said output motor hydraulic rotor to the expanding chamber of said input pump hydraulic rotor; a flexible annular member positioned between said output motor rotor and the bore of the outer housing so that flexure of said annular member varies the hydraulic displacement of said output motor rotor; four inwardly projecting equidistant lugs on said annular member; and four equidistant peripheral slots on said output motor rotor engaged by said inwardly projecting lugs whereby said annular member is mounted on said output motor rotor.

8. In a variable speed variable torque hydraulic transmission, an input shaft; an input pump rotor; an output shaft; an output motor hydraulic rotor; said output shaft having a portion forming the bearing for said input shaft; a symmetrical non-circular bore in said output motor hydraulic rotor wherein said input pump hydraulic rotor is revolubly mounted to form contracting and expanding chambers; a unitary housing enclosing said output shaft and said output motor hydraulic rotor to form contracting and expanding chambers therewith; short straight slots through said output motor hydraulic rotor communicating said eccentric bore in said output motor hydraulic rotor with said cavity between said output motor hydraulic rotor and said housing so that liquid may pass from the contracting chamber of said input pump hydraulic rotor to the expanding chamber of said output motor rotor; short straight slots through said output motor hydraulic rotor communicating said cavity between said output motor hydraulic rotor and said housing with said bore in said output motor hydraulic rotor so that liquid may pass from the contracting chamber of said output motor hydraulic rotor to the expanding chamber of said input pump hydraulic rotor; a flexible annular member positioned between said output motor rotor and the bore of the outer housing so that flexure of said annular member varies the hydraulic displacement of said output motor rotor; four inwardly projecting equidistant lugs on said annular member; four equidistant peripheral slots on said output motor rotor engaged by said inwardly projecting lugs whereby said annular member is mounted on said output motor rotor; and an auxiliary pump to force liquid under pressure to the base of two of said peripheral slots diametrically opposing each other whereby said flexible annular member may be flexed.

9. In a variable speed variable torque hydraulic transmission, an input pump rotor; an output motor rotor; an eccentric bore in said output motor rotor in which said input pump rotor is revolubly mounted; radially movable members coacting between the walls of said eccentric bore and said input pump rotor whereby contracting and expanding chambers are formed; a plurality of equidistant radial slots on the periphery of said output motor rotor; a flexible annular member surrounding said output motor rotor; a plurality of inwardly projecting lugs on said annular member slidably inserted in said slots of the output motor rotor in a substantially piston-like manner; an outer housing encasing said output motor rotor and annular member therein; further radially movable members coacting with said annular member and said outer housing to produce variable expanding and contracting chambers whereby the flexure of said annular member varies the rotational displacement of said output motor rotor; and means for controlling the flexure of said annular member.

10. A variable speed variable torque hydraulic transmission comprising an outer housing; an output motor rotor revolubly mounted in a bore in said outer housing; a symmetrical elongated bore in said output motor rotor; an input pump rotor revolubly mounted in said symmetrical bore; radially movable members coacting with the bore of said outer housing and said output motor rotor to form contracting and expanding chambers for said output motor rotor; radially movable members coacting with said elongated bore in said output motor rotor and said input pump rotor to form contracting and expanding chambers at said input pump rotor; short straight passages through said output motor rotor connecting said contracting chambers at said input pump rotor with said expanding chambers at said output motor rotor; and short straight passages through said output motor rotor connecting said contracting chambers of said output motor rotor with said expanding chambers at the input pump rotor.

11. A variable speed variable torque hydraulic transmission comprising an input pump rotor; an output motor rotor forming a housing for said input pump rotor; a single outer housing with a bore for said input pump rotor and said output motor rotor mounted therein; a flexible annular member positioned between said output motor rotor and said outer housing; four equidistant outwardly projecting radial lugs on said annular member; four corresponding radial slots in said outer housing so positioned in the bore of said outer housing as to receive the radial lugs of said annular member; screws with integral gear heads positioned radially in said outer housing and bearing upon said radial lugs of said annular member to vary the curvature of said flexible annular member; a ring gear meshing with said integral gear heads of said screws to simultaneously actuate all of said screws; and a handle for turning one of said screws to flex said annular member.

12. A variable speed variable torque hydraulic transmission; a unitary outer housing; a round bore in said outer housing; an output motor rotor revolubly mounted in said round bore; a flexible annular member positioned between said output motor rotor and said outer housing; a plurality of outwardly projecting radial lugs on said annular member slidably inserted in corresponding slots in the wall of said round bore of said outer housing; radially movable members coacting with said output motor rotor and said annular member to form expanding and contracting chambers at said output motor rotor; a symmetrical non-circular bore in said output motor rotor; an input pump rotor revolubly mounted in said non-circular bore; radially movable members coacting with said non-circular bore and said input pump rotor to form expanding and contracting chambers at said input pump rotor; an annular pressure chamber in said outer casing co-axial with and lateral of said rotors; an annular return chamber co-axial with and lateral of said rotors; short passages connecting said contracting chambers at said input pump rotor to said annular pressure chamber; short passages connecting said annular pressure chamber to said expanding chambers at said output motor rotor; short passages connecting said contracting chambers at said output motor rotor to said return annular chamber; and short passages connecting said annular return chamber to said expanding chambers at said input pump rotor.

13. A variable speed variable torque hydraulic transmission comprising a single outer casing; a bore in said casing; a flexible annular member in said bore; a plurality of outwardly projecting lugs on the periphery of said annular member slidably inserted in corresponding slots in the wall of said bore of said outer casing; threaded studs through said outer casing actuating said lugs to distort said annular member; gears secured to said studs; a ring gear threaded with said gears of said studs to simultaneously actuate all of said studs; and a handle for turning one of said studs to flex said annular member; an output motor rotor revolubly mounted in said annular member; radially movable members coacting with said output motor rotor and said annular member to form expanding and contracting chambers when said annular member is flexed; a symmetrical non-circular bore in said output motor rotor; an input pump rotor revolubly mounted in said non-circular bore; and radially movable members coacting with said symmetrical non-circular bore and said input pump rotor to form contracting and expanding chambers.

14. A variable speed variable torque hydraulic transmission suitable for use in a motor vehicle having an output motor rotor; a bore in said output motor rotor; an input pump rotor revolubly mounted in said bore; radially movable sealing members mounted in said input pump rotor and coacting with said bore to form upon rotation of said input pump rotor contracting and expanding chambers; a single housing encasing said output motor rotor, a flexible annular member positioned between said housing and said output motor rotor; radially movable sealing members mounted in said output motor rotor and coacting with said flexible annular member; an annular pressure chamber in said outer housing positioned co-axially and to one side of said rotors; a return annular chamber in said outer housing co-axial with said rotors and positioned on the other side of said rotors; means for controlling the flexion of said annular member including two opposed pairs of outwardly projecting lugs on said annular member; double acting pistons secured to said lugs; radial cylinder heads within which said pistons operate; pressure conduits from said annular pressure chambers to the distal side of a pair of said pistons opposing one another; pressure conduits from said annular pressure chamber to the proximal side of the other opposing pair of pistons whereby said flexible annular member may be distorted to vary the capacity of the expanding and contracting chambers of the output motor rotor; return conduits connecting the other sides of said pistons with the return annular chamber; and valve means for simultaneously connecting said pressure chamber to said pressure conduits and said return chamber to said return conduits.

15. A variable speed variable torque hydraulic transmission suitable for use in an automobile, comprising a single outer housing; a concentric bore in said outer housing; a flexible annular member slidably mounted in said concentric bore of said outer housing; an output motor rotor revolubly mounted in said annular member; a symmetrical non-circular bore in said output motor rotor; an input pump rotor revolubly mounted in said symmetrical bore; an annular pressure chamber in said outer housing positioned to one side of said rotors; an annular return chamber in said outer housing positioned on the other side of said rotors; conduits connecting said pressure chamber with the contracting chambers of said input pump rotor; conduits connecting said pressure chamber with the expanding chambers of said output motor rotor; conduits connecting the contracting chamber of said output motor rotor with said return chamber; conduits connecting said return chamber with the expanding chamber of said input pump rotor; hydraulic means operatively connected to said pressure chamber for flexing said annular member to vary the hydraulic displacement of said output motor rotor; a by-pass from said annular pressure chamber to said annular return chamber to equalize pressure in said annular chambers; and an open and close valve in said by-pass.

16. In a variable speed variable torque hydraulic transmission suitable for use in a motor vehicle an output motor rotor; a symmetrical non-circular bore in said output motor rotor; an input pump rotor revolubly mounted in said bore; a housing enclosing said output motor rotor and said input pump rotor mounted therein; an annular pressure chamber in said housing positioned co-axially and to one side of said rotors; an annular return chamber positioned co-axially and to the other side of said rotors; a flexible annular member positioned between said output motor rotor and said outer housing; means for controlling the eccentricity of said annular member including two opposing pairs of outwardly projecting radial lugs integral with said annular member and slidably mounted in corresponding radial slots of said outer housing to support said annular member; two pairs of double acting radially reciprocating pistons secured to said lugs; radial cylinder heads on said outer housing within which said pistons operate; pressure conduits leading from said annular chamber to the distal side of a pair of pistons opposing one another; pressure conduits from said annular pressure chamber to the proximal side of the other opposing pair of pistons to flex said annular member; return conduits from the other side of said pistons to the return annular chamber; a pressure responsive valve interposed in said conduits; a pressure sensitive member in said valve closing said pressure conduits, so positioned as to yield under pressure from said annular pressure chamber to allow a greater flow of liquid as the pressure in said annular pressure chamber is increased whereby the degree of distortion of said annular member will be increased, and means for positively moving said valve to reverse the direction of rotation of said output motor rotor.

17. In a variable speed variable torque hydraulic transmission suitable for use in a motor vehicle, an output motor rotor; a cavity having walls in said output motor rotor; an input pump rotor revolubly mounted in said cavity to co-act with the walls thereof to operate as an hydraulic rotary pump; a housing enclosing said output motor rotor and said input pump rotor mounted therein; an annular pressure chamber in said housing positioned co-axially and to one side of said rotors; an annular return chamber positioned co-axially and to the other side of said rotors; a flexible annular member positioned between said output motor rotor and said outer housing; means for controlling the eccentricity of said annular member including two opposing pairs of outwardly projecting radial lugs integral with said annular member and slidably mounted in corresponding radial slots of said outer housing to support said annular member; a double acting radially reciprocating piston secured to each of said lugs; radial cylinder heads on said housing within which said pistons operate; two pairs of conduits, one pair leading to the distal side of a pair of said pistons secured to one of said opposing pairs of radial lugs, the other pair leading to the proximal side of the remaining pair of pistons, two further pairs of conduits leading from the opposite sides of said reciprocating pistons; a spring-loaded four-way spool type valve; terminal heads of different diameter on said spool; both pairs of the first-named conduits entering said valve at the normal position of the larger of said terminal heads and both pairs of said second-named conduits entering the valve at the normal position of the smaller of said terminal heads; and a conduit from said annular pressure chamber communicating with said valve intermediate said heads of said spool whereby hydraulic pressure from said pressure chamber exerts axial thrust on the larger head of said spring-loaded spool valve so that when said hydraulic pressure exceeds a predetermined amount, hydraulic pressure may enter said first-named conduits to flex said flexible annular member to increase the displacement at said output motor rotor and vary the transmission ratio.

18. A variable speed variable torque hydraulic transmission suitable for use in automobiles as described in claim 17 and further characterized by means on said spool valve whereby the spool of said valve may be thrust axially to reverse the pressure flow in the first-named and second-named conduits, thereby reversing the flexion of said annular member to reverse the hydraulic characteristics of said output motor rotor.

19. An hydraulic transmission comprising in a common housing an input pump rotor; an output motor rotor; a unitary flexible annular member surrounding said output rotor, so positioned that flexure of the annular member varies the hydraulic displacement of said output rotor; a symmetrical elongated bore in said output rotor with said input pump rotor revolubly mounted in said bore; short straight ducts connecting the contracting chambers of said input pump rotor and the expanding chambers of said output motor rotor; short straight ducts connecting the contracting chambers of said output motor rotor and the expanding chambers of said input pump rotor; and means for controlling the flexure of said flexible annular member to effect various predetermined ratios of relative displacement between said input rotor and the output rotor.

20. A variable speed variable torque balanced hydraulic transmission comprising a single outer housing having a circular bore; an input pump rotor; a hollow output motor rotor having a symmetrical interior periphery for receiving said input pump rotor, said output motor rotor, acting as the housing for said input pump rotor; a flexible annular member located within said circular bore of said outer housing controlling the hydraulic displacement of the output motor rotor and separating the said output motor rotor from the outer housing; and means responsive to the fluid pressure at said output motor rotor for flexing said annular member to vary the said hydraulic displacement of said output motor rotor in the bore of said outer housing.

21. A variable speed variable torque hydraulic transmission comprising, a single outer housing; a hollow output motor rotor having a symmetrically developed internal elongated bore; an input motor rotor mounted in said bore to form an operative hydraulically balanced hydraulic pump; a unitary flexible annular member mounted between said output motor rotor and said housing so that the flexure of said member varies the displacement of the output motor rotor; members mounted for radial movement attached to said annular member to diametrally expand said annular member in one direction and to constrict it at points substantially 90° from the points of expansion to produce the variable expanding and contracting chambers; and means operative to move said radially movable members to control the flexure of said annular member to vary the output torque of said transmission.

22. In a combination within a single outer housing an output hydraulic rotor; a non-circular symmetrical bore in said output rotor; an input hydraulic rotor revolubly mounted in said bore to form diametrically opposed contracting chambers and diametrally opposed expanding chambers; a flexible annular member positioned between said output hydraulic rotor and said outer housing; means for flexing said annular member to vary the displacement of the output hydraulic rotor; and short passages connecting the contracting hydraulic chambers of the input rotor with the expanding hydraulic chambers of the output rotor to form an hydraulic transmission.

23. In an hydraulic transmission having an input shaft and an output shaft the combination with an input hydraulic pump rotor on said input shaft, of an output motor rotor on said output shaft and annularly mounted around said input pump rotor to form an operative hydraulically balanced casing therefor having at least two contracting chambers and two expanding chambers, a unitary outer casing surrounding said input pump rotor and said output motor rotor, a unitary flexible ring mounted between the inside of said casing and said output motor rotor, and means to flex said ring to vary the capacity of said output motor rotor.

24. In a variable speed variable torque hydraulic transmission suitable for use in a motor vehicle, an output motor rotor; a symmetrical non-circular bore in said output motor rotor; an input pump rotor revolubly mounted in said bore; a housing enclosing said output motor rotor and said input pump rotor mounted therein; an annular pressure chamber in said housing positioned co-axially and to one side of said rotors; an annular return chamber positioned co-axially and to the other side of said rotors; a flexible annular member positioned between said output motor rotor and said outer housing; means for controlling the eccentricity of said annular member including two opposing pairs of outwardly projecting radial lugs integral with said annular member and slidably mounted in corresponding radial slots of said outer housing to support said annular member; two pairs of double acting radially reciprocating pistons secured to said lugs; radial cylinder heads on said outer housing within which said pistons operate; pressure conduits leading from said annular chamber to the distal side of a pair of pistons opposing one another; pressure conduits from said annular pressure chamber to the proximal side of the other opposing pair of pistons to flex said annular member; return conduits from the other sides of said pistons to the return annular chamber; a pressure responsive valve interposed in said conduits; and a pressure sensitive member in said valve closing said pressure conduits, so positioned as to yield under pressure from said annular pressure chamber to allow a greater flow of liquid as the pressure in said annular pressure chamber is increased whereby the degree of distortion of said annular member will be increased.

HENRY H. WHEELER.

References Cited in the file of this patent

UNITED STATES PATENTS

| Number | Name | Date |
|---|---|---|
| 1,190,139 | Ford | July 4, 1916 |
| 2,016,315 | Calzoni | Oct. 8, 1935 |
| 2,222,144 | Ferris | Nov. 19, 1940 |
| 2,256,459 | Kendrick | Sept. 16, 1941 |
| 2,368,223 | Kendrick | Jan. 30, 1945 |
| 2,434,546 | Breedlove | Jan. 13, 1948 |

FOREIGN PATENTS

| Number | Country | Date |
|---|---|---|
| 221,749 | Great Britain | Sept. 18, 1924 |